United States Patent
Kling

(10) Patent No.: US 12,391,164 B2
(45) Date of Patent: Aug. 19, 2025

(54) VEHICLE BEVERAGE HOLDER

(71) Applicant: Dr. Ing. h.c. F. Porsche Aktiengesellschaft, Stuttgart (DE)

(72) Inventor: Achim Kling, Neuweiler-Agenbach (DE)

(73) Assignee: Dr. Ing. h. c. F. Porsche AG, Stuttgart (DE)

(*) Notice: Subject to any disclaimer, the term of this patent is extended or adjusted under 35 U.S.C. 154(b) by 0 days.

(21) Appl. No.: 18/603,691

(22) Filed: Mar. 13, 2024

(65) Prior Publication Data

US 2024/0326677 A1 Oct. 3, 2024

(30) Foreign Application Priority Data

Mar. 27, 2023 (DE) .................. 10 2023 107 655.8

(51) Int. Cl.
*B60N 3/10* (2006.01)
(52) U.S. Cl.
CPC ............. *B60N 3/106* (2013.01); *B60N 3/101* (2013.01)
(58) Field of Classification Search
CPC ..... Y10S 224/926; B60N 3/108; B60N 3/106; B60N 3/101; B60N 3/10
See application file for complete search history.

(56) References Cited

U.S. PATENT DOCUMENTS

| | | | |
|---|---|---|---|
| 6,302,364 B1 * | 10/2001 | Chiueh | B60N 3/10 206/545 |
| 9,120,402 B2 * | 9/2015 | Caruso | B60N 3/108 |
| 9,216,693 B2 * | 12/2015 | Poindexter, Jr. | B60N 3/101 |
| 10,882,433 B2 | 1/2021 | Kim et al. | |
| 10,894,496 B2 | 1/2021 | Sukumar | |
| 2019/0168654 A1 * | 6/2019 | Agresti | B60N 3/108 |
| 2022/0281370 A1 | 9/2022 | Stubbings | |

FOREIGN PATENT DOCUMENTS

| | | |
|---|---|---|
| DE | 10 2015 208 828 | 11/2016 |
| DE | 10 2015 013 074 | 4/2017 |
| DE | 10 2015 220 503 | 4/2017 |
| DE | 10 2016 110 727 | 12/2017 |
| DE | 10 2017 129 412 | 5/2019 |
| DE | 10 2018 130 152 | 3/2020 |
| DE | 10 2022 121 678 | 11/2023 |
| EP | 3434514 A1 | 1/2019 |

* cited by examiner

*Primary Examiner* — Shawn M Braden
(74) *Attorney, Agent, or Firm* — Gerald E. Hespos; Michael J. Porco

(57) ABSTRACT

A vehicle beverage holder (10) has a rigid beverage holder frame (18) defining at least one cup-shaped receptacle (20, 20') having a circumferential wall (24), and defining a beverage container receiving space (21, 21') accessible from above for holding a beverage container (12). At least one hump opening (30) extends across a curved section of the circumferential wall (24). A clamping textile body (50) is outward of the circumferential wall (24) and forms a clamping textile hump (40) that projects convexly in a radial direction through the hump opening (30) and into the receiving space (21). At least one separate clamping shell (60, 60') is outward of the clamping textile body (50) and clamps the clamping textile body (50) between the circumferential wall (24) and the clamping shell (60, 60').

9 Claims, 3 Drawing Sheets

VEHICLE BEVERAGE HOLDER

CROSS-REFERENCE TO RELATED APPLICATION

This application claims priority on German Patent Application No 10 2023 107 655.8 filed Mar. 27, 2023, the entire disclosure of which is incorporated herein by reference.

BACKGROUND

Field of the Invention. The invention relates to a vehicle beverage holder having a cup-shaped receptacle for holding a beverage container, for example a beverage bottle, a beverage can or a beverage cup, in a tilt-resistant manner.

Related Art Vehicle beverage holders that have clamping elements to clamp beverage containers of different diameters in a tilt- and slip-resistant manner are disclosed in: U.S. Pat. No. 10,882,433; US 2022/0281370; U.S. Pat. No. 10,894,496; EP 3 434 514 A1; DE 10 2015 220 503 A1; DE 10 2015 013 074 A1; DE 10 2015 208 828 A1; and DE 10 2017 129 412 B3.

An object of the invention is to create a vehicle beverage holder that is easy to manufacture.

SUMMARY OF THE INVENTION

The invention relates to a vehicle beverage holder that has a rigid beverage holder frame defining at least one cup-shaped receptacle with a round bottom wall and a circumferential wall. Thus, the receptacle forms a beverage holder receiving space that is accessible from above for holding a beverage container, such as a beverage bottle, a beverage can, or a beverage cup, in a tilt-resistant manner.

The circumferential wall of the receptacle does not define a continuous closed surface. Rather, at least one hump opening extends through a curved section of the circumferential wall. A clamping textile hump formed by a clamping textile body projects convexly through the hump opening in a radial direction proximally into the receiving space. More particularly, the clamping textile hump projects radially inward from the surface of the circumferential wall. A curved section of the circumferential wall is a section in which the circumferential wall is curved convexly outward. Typically, the circumferential wall is substantially internally cylindrical or internally conical. In the top plan view, the clamping textile hump approximately forms a circular segment.

The clamping textile body is flexible and inherently elastic. This inherent elasticity causes the part of the clamping textile body that aligns with the hump opening to project from the outside through the hump opening and towards the receptacle center. This inwardly projecting part of the clamping textile body forms the hump body. The hump body has a rounded convex shape with a longitudinal axis that lies in a horizontal plane. In this way, very simple and inexpensive means are used for fixing a beverage holder in the receiving space despite different diameters of the beverage holder. The elasticity of the clamping textile hump further dampens vehicle vibrations.

Some embodiments have at least one separate clamping shell placed on the outside of the circumferential wall, such that the clamping textile body is clamped fixedly between the outside of the circumferential wall and the inside of the clamping shell. The clamping shell axially fixes the clamping textile body with a friction lock, such that the clamping textile body cannot slip axially or vertically from the receptacle. Adhesion of the clamping textile body to the outer side of the circumferential wall can be omitted entirely.

The clamping textile hump need not be backfilled distally. Rather, the radial clamping force is produced exclusively by the inherent elasticity of the clamping textile body. In this way, the clamping textile hump forms a hollow clamping pad.

The circumferential wall of the receptacle may have at least two hump openings, and each hump opening has a clamping textile hump, such that at least two clamping textile humps are associated with each receptacle. The normals of the at least two clamping textile humps of a receptacle include an angle of at least 45°.

The clamping textile body forms a closed ring band that is stretched onto the outside of the circumferential wall of the receptacle. The inherent elasticity of the clamping textile body is so great that the clamping textile body stretches far into the interior of the receptacle in the area of the hump openings in the curved sections of the circumferential wall. By using a closed ring band for the clamping textile body, the tangential clamping forces of the clamping textile body are absorbed in the form of compressive forces between the clamping textile body and the outer side of the receptacle, such that, for example, bonding can be completely dispensed with.

Some embodiments have two clamping shells that are mirror-symmetric to each other and that are clamped to the circumferential wall. In this way, the clamping shells can be mounted from a radial direction. The two clamping shells may be connected tangentially to each other, for example bolted together, after being placed on the outer side of the circumferential wall.

The one-piece beverage holder frame may form two receptacles that are directly adjacent to each other. All of the clamping textile humps of both receptacles are formed from a single clamping textile body. In this way, up to a total of six or eight clamping textile humps can be formed from a single clamping textile body.

The two clamping shells that are mirror-symmetric to each other may form two half-shells that partially encompass the two circumferential walls of the two receptacles so that the clamping textile body is clamped between the two half-shells and the two circumferential walls of the two receptacles. The two clamping shells are connected tangentially to each other, such as by bolts.

The clamping shell of some embodiments has two half-shells connected unitarily by a connecting web between the two half-shells to define a one-piece clamping shell. The two connection webs of other embodiments may have the two double clamping shells held tangentially together by a U-shaped retaining clip attached from below. In this way, the two middle regions of the double clamping shells are fixed tangentially by simple means, without the need for a direct bolt connection that could inevitably damage the clamping textile body.

An embodiment of the invention will be explained in further detail in the following with reference to the drawings.

DETAILED DESCRIPTION

Figure 1:
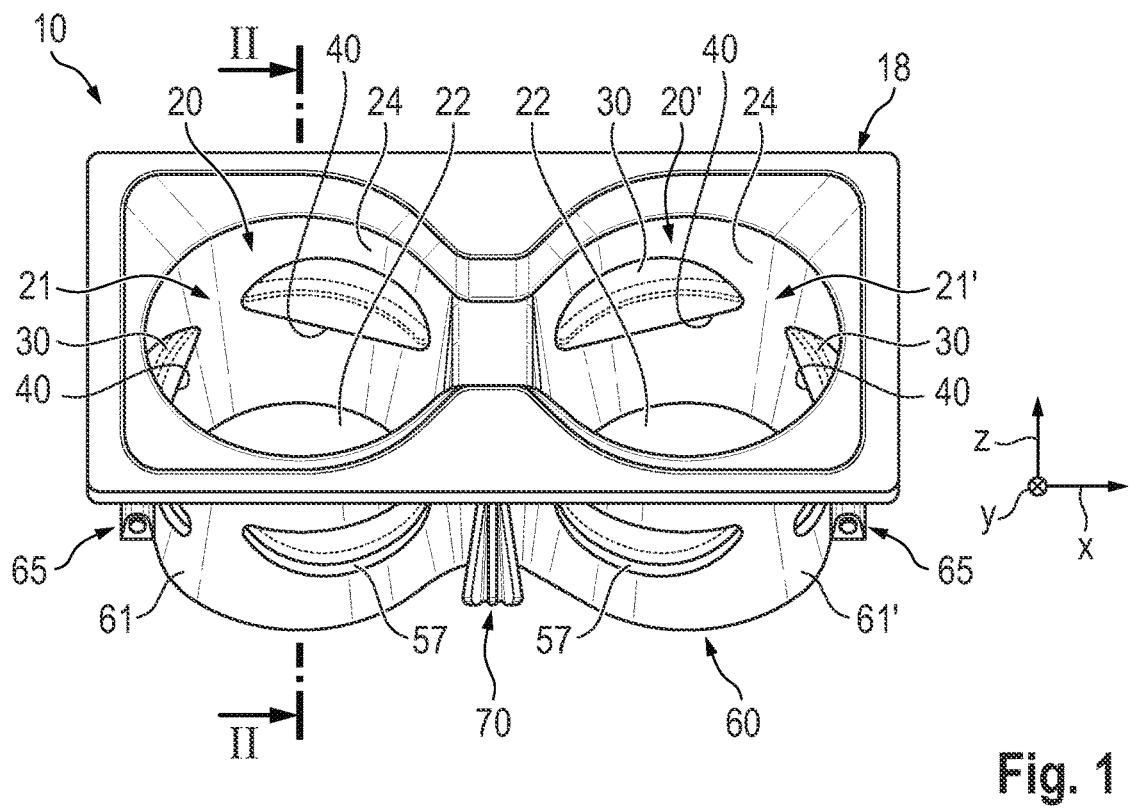
FIG. 1 is a top perspective view of a vehicle beverage holder.
Figure 2:
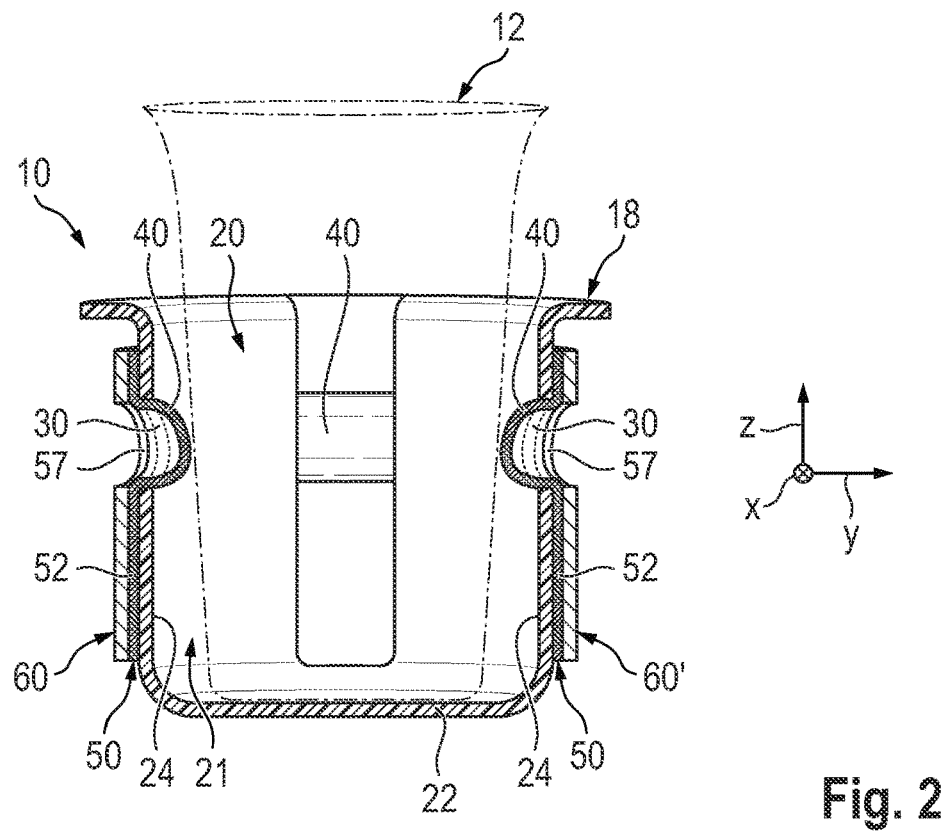
FIG. 2 is a vertical cross-section taken along line I-I of FIG. 1.
Figure 4:
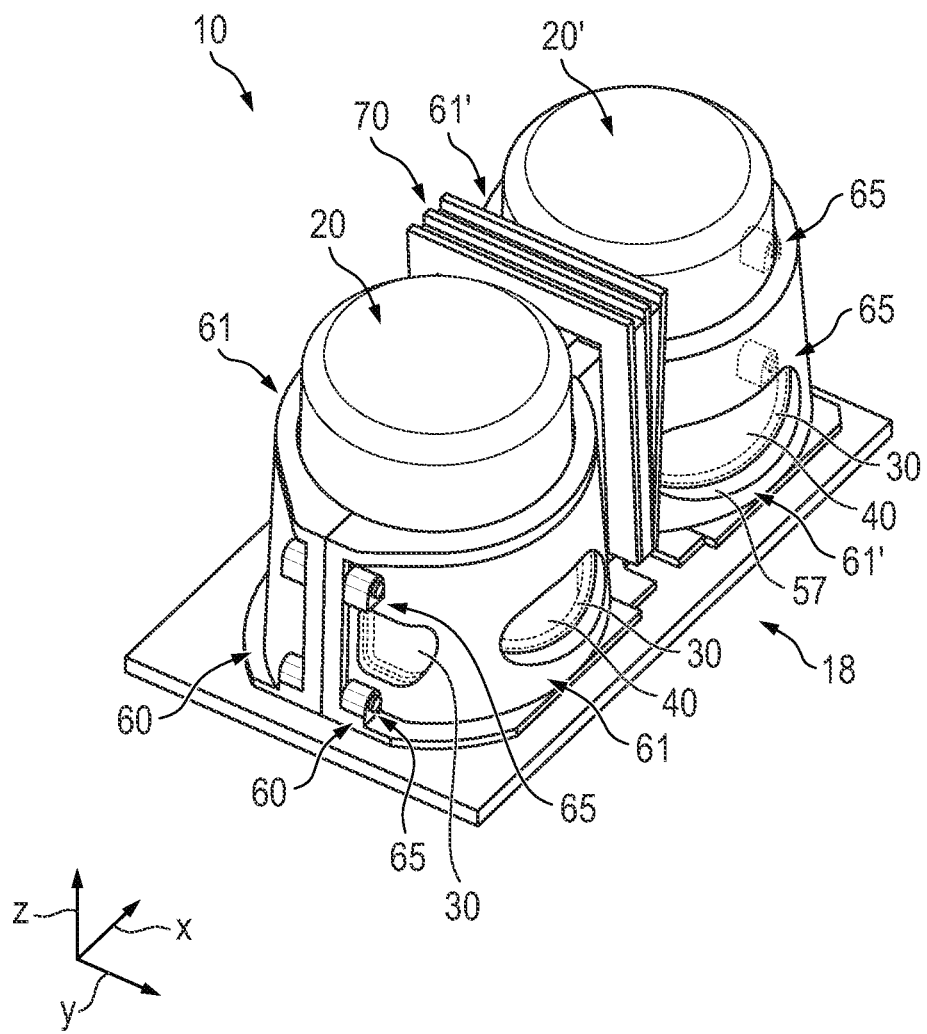
FIG. 4 is a bottom perspective view of the beverage holder of FIGS. 1 and 2.

FIGS. 1, 2 and 4 show a vehicle beverage holder 10 with a rigid one-piece beverage holder frame 18 made of plastic and forming two cup-shaped receptacles 20, 20' arranged directly adjacent to each other. The two receptacles 20, 20' each form a beverage holder receiving space 21, 21' for holding a beverage container 12 in a tilt-resistant manner. For example, the beverage container 12 can be a beverage bottle, beverage can or beverage cup.

Each receptacle 20, 20' has a circular bottom wall 22 and a slightly inner cylindrical or slightly conical circumferential wall 24. Three elliptical hump openings 30 are in the circumferential wall 24 of each receptacle 20, 20', and each elliptical hump opening 30 is elongated over a curved section of the circumferential wall 24 in a horizontal plane. The normals of each of the three hump openings 30 of a receptacle 20, 20' are at an angle of approximately 100° to each other.

A flexible and inherently elastic clamping textile body 50 in the form of a closed ring band 55 is stretched from the outside onto the circumferential walls 24 of the two receptacles 20, 20'. The clamping textile body 50 is formed by an elastic textile web 52.

Figure 3:
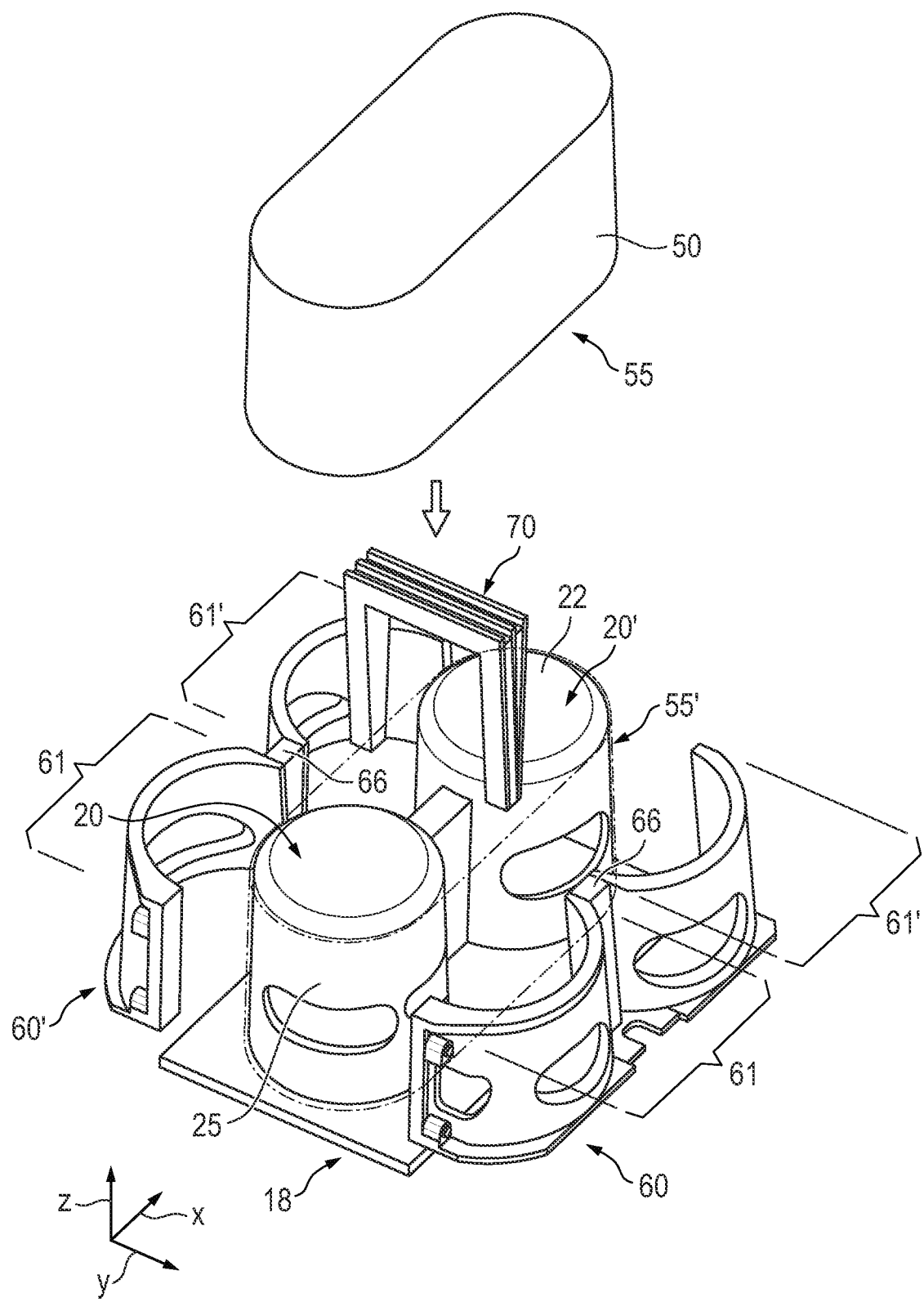
FIG. 3 is a bottom exploded perspective view of the components of the vehicle beverage holder of FIGS. 1 and 2.

As can be seen in FIGS. 3 and 4, the clamping textile body 50 is clamped between the circumferential wall 24 and the clamping shell 60, 60' by two plastic clamping shells 60, 60' that are mirror-symmetrical to each other and are mounted radially outwardly on the beverage holder frame 18. Each clamping shell 60, 60' is approximately omega-shaped in plan view and has two half-shells 61, 61' integrally connected to each other by a connecting web 66. The two clamping shells 60, 60' are connected tangentially to each other at their longitudinal ends, each via tangential bolt connections 65. Furthermore, the clamping shells 60, 60' are held together in the horizontal transverse direction y in the area of the clamping shell center or the connecting webs 66 by a U-shaped retaining clip 70 attached from below.

The hump openings 30 are elongated in a horizontal plane xy and are arranged in the area of a curvature of the circumferential wall 24. Additionally, the clamping textile body 50 is fixed with elastic pre-clamping on the circumferential wall outer side 25 so that clamping textile humps 40 are formed in the area of the hump openings 30 and project convexly in a radial direction into the receiving space 21, 21'. In this way, three clamping textile humps 40 are formed in each receiving space 21, 21', and the normals of the clamping textile humps 40 are approximately at an angle of 100° to each other. The two clamping shells 60, 60' each have a pressure equalization opening 57 in the area of the hump openings 30 or the clamping textile humps 40 to ensure that the same atmospheric pressure always prevails on the distal outer side of the clamping textile humps 40 as on the proximal inner side when the clamping textile body 50 should be impermeable to air.

The invention claimed is:

1. A vehicle beverage holder (10) comprising:
    a rigid beverage holder frame (18) defining at least one cup-shaped receptacle (20, 20') having a circumferential wall (24), and defining a beverage holder receiving space (21, 21') accessible from above for holding a beverage container (12) in a tilt-resistant manner, at least one hump opening (30) provided in the circumferential wall (24) and extending across a curved section of the circumferential wall (24);
    a clamping textile body (50) disposed outward of the circumferential wall (24) and forming at least one clamping textile hump (40) that projects convexly in a radial direction through the at least one hump opening (30) and into the receiving space (21, 21'); and
    at least one clamping shell (60, 60') disposed outward of the clamping textile body (50) and the circumferential wall (24) and clamping the clamping textile body (50) between the circumferential wall (24) and the at least one clamping shell (60, 60').

2. The vehicle beverage holder (10) of claim 1, wherein the clamping textile body (50) forms a closed ring band (55) that elastically engages an outer side (25) of the circumferential wall (24).

3. The vehicle beverage holder (10) of claim 2, wherein the at least one clamping shell (60, 60') comprises two clamping shells (60, 60') that are mirror-symmetrical to each other, the clamping textile body (50) being clamped to the circumferential wall (24) by the two clamping shells (60, 60').

4. The vehicle beverage holder (10) of claim 1, wherein the at least one hump opening (30) in the circumferential wall (24) comprises at least two hump openings (30), and the at least one clamping textile hump (40) comprises at least two textile humps (40) projecting convexly in radial directions through the respective hump opening (30) and into the receiving space (21, 21') of the receptacle (20, 20').

5. The vehicle beverage holder (10) of claim 4, wherein the cup holder frame (18) forms two receptacles (20, 20') and two circumferential walls (24) arranged directly adjacent to each other, and the at least two clamping textile humps (40) are formed from a single clamping textile body (50).

6. The vehicle beverage holder (10) of claim 5, wherein the at least one clamping shell (60, 60') comprises two clamping shells (60, 60') that clamp the clamping textile body (50) to the two circumferential walls (24) of the two receptacles (20, 20'), the two clamping shells (60, 60') being mirror-symmetrical to each other and forming two half-shells (61, 61').

7. The vehicle beverage holder (10) of claim 6, wherein the two half-shells (61, 61') of each of the two clamping shells (60, 60') are connected tangentially to each other.

8. The vehicle beverage holder (10) of claim 6, wherein a connecting web (66) is provided between the two half-shells (61, 61') of each clamping shell (60, 60'), and the connecting webs (66) of the two clamping shells (60, 60') are held together by a U-shaped retaining clip (70).

9. The vehicle beverage holder (10) of claim 1, wherein the at least one cup-shaped receptacle (20, 20') has a bottom wall (22).

* * * * *